(12) United States Patent
Aggarwal et al.

(10) Patent No.: US 7,143,359 B2
(45) Date of Patent: Nov. 28, 2006

(54) EMULATING ADVANCED GRAPHICAL USER INTERFACE ELEMENTS IN A HYPERMEDIA CONTENT BROWSER

(75) Inventors: Radhika Aggarwal, Raleigh, NC (US); William H. Krebs Jr., Cary, NC (US); Elizabeth A. Schreiber, Apex, NC (US); David B. Styles, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 812 days.

(21) Appl. No.: 10/041,178

(22) Filed: Jan. 3, 2002

(65) Prior Publication Data

US 2003/0122869 A1   Jul. 3, 2003

(51) Int. Cl.
*G06F 3/00* (2006.01)

(52) U.S. Cl. .............. 715/760; 715/843; 715/825; 715/505; 715/513; 715/522

(58) Field of Classification Search .......... 345/760, 345/325, 625, 634, 650, 656, 661, 667, 682, 345/738, 744, 748, 749; 354/619
See application file for complete search history.

(56) References Cited

U.S. PATENT DOCUMENTS

| | | | |
|---|---|---|---|
| 4,873,662 A * | 10/1989 | Sargent | 711/200 |
| 5,710,887 A * | 1/1998 | Chelliah et al. | 705/26 |
| 5,710,918 A * | 1/1998 | Lagarde et al. | 707/10 |
| 5,751,922 A * | 5/1998 | Harada | 358/1.13 |
| 5,802,530 A * | 9/1998 | Van Hoff | 715/513 |
| 5,884,056 A * | 3/1999 | Steele | 345/738 |
| 5,945,989 A * | 8/1999 | Freishtat et al. | 345/760 |
| 5,973,696 A * | 10/1999 | Agranat et al. | 345/760 |
| 5,983,227 A * | 11/1999 | Nazem et al. | 707/10 |
| 6,035,324 A * | 3/2000 | Chang et al. | 709/203 |
| 6,108,673 A | 8/2000 | Brandt et al. | 707/505 |
| 6,141,010 A * | 10/2000 | Hoyle | 345/854 |
| 6,166,735 A * | 12/2000 | Dom et al. | 345/749 |
| 6,169,992 B1 * | 1/2001 | Beall et al. | 707/103 R |
| 6,262,729 B1 * | 7/2001 | Marcos et al. | 345/744 |
| 6,286,051 B1 * | 9/2001 | Becker et al. | 709/236 |
| 6,504,554 B1 * | 1/2003 | Stone et al. | 715/760 |

(Continued)

OTHER PUBLICATIONS

Thistlewaite, P., et al., "Active FORMs in HTML", *Computer Networks and ISDN Systems*, vol. 28, No. 7-11, pp. 1355-1364, (May 1996).

*Primary Examiner*—Kristine Kincaid
*Assistant Examiner*—Ryan Pitaro
(74) *Attorney, Agent, or Firm*—Gerald R. Woods; Steven M. Greenberg; Carey Rodriguez Greenberg & Paul LLP

(57) ABSTRACT

A graphical user interface (GUI) element rendering method. A GUI element rendering method can include serving a Web page to a Web browser. The Web page can include markup which defines a form and the form can include one or more submittable input elements, each submittable input element having a corresponding key-value pair. The key-value pair can include an identifying key and a value, and one or more of the identifying keys can include a shallow form submit key indicating a request for advanced GUI element processing. One or more of the submitted key-value pairs can be received from the Web browser from among which a shallow form submit key can be identified. In consequence, advanced GUI element processing can be performed based upon values which are associated with the identified shallow form submit key.

20 Claims, 3 Drawing Sheets

U.S. PATENT DOCUMENTS 6,941,521 B1*  9/2005  Lin et al. .................... 715/762
6,983,421 B1*  1/2006  Lahti et al. ................. 715/763

2002/0002568 A1*  1/2002  Judson ...................... 707/513

* cited by examiner

EMULATING ADVANCED GRAPHICAL USER INTERFACE ELEMENTS IN A HYPERMEDIA CONTENT BROWSER

BACKGROUND OF THE INVENTION

1. Technical Field

The present invention relates to rendering graphical user interface (GUI) elements in a content browser and more particularly to emulating advanced GUI elements in a content browser.

2. Description of the Related Art

Prior to the popularization of the Internet and the subsequent deployment of the World Wide Web, software publishers typically distributed computer applications via storage media such as a computer diskette or compact disc. Initially, such stand-alone computer applications included underlying program logic, data storage and, optionally, a user interface. Over time, as the processing capabilities of underlying computing devices evolved, increasingly more complex user interfaces were developed for use with corresponding computer applications. In particular, the advent of the graphical user interface (GUI) resulted in an expectation among end users that a computer application include an intuitive and aesthetically pleasing graphical interface through which end users could effectively interact with the computer application.

Recently, given the popularization of the Internet and the World Wide Web, it is no longer reasonable to presume that computer applications are distributed exclusively via disk medium. Rather, in many cases, conventional computer programs are distributed electronically via the Internet. More importantly, however, in many cases computer applications are no longer distributed as stand-alone executable programs. Rather, many computer applications are distributed as Web applications which can include a collection of hypermedia documents such as Web pages which can be viewed in hypermedia content browsers such as Web browsers.

In the case of a Web application, the user interacts with the underlying program logic not through a traditional GUI, but through a GUI provided by GUI elements e embedded in a hypermedia document displayed in a hypermedia content browser. Unfortunately, the Web-based GUI does not enjoy the same flexibility as the conventional GUI. Specifically, advanced GUI elements of conventional, stand-alone executable applications which can be dynamically modified during run-time are not also included as part of a Web-enabled GUI. In fact, fundamental limitations of modern markup languages such as HTML prohibit software developers from accessing advanced GUI elements such as an expandable/collapsible image, a tab on a property sheet, and the like.

Nevertheless, applications that are distributed both in Web-based and stand-alone environments preferably should behave in a similar fashion in order to maximize program ease of use and to enable the use of a single application code base and set of educational/help materials. To achieve consistent behavior among Web-based and stand-alone computer programs, advanced GUI elements need to be provided in the Web-served environment, since end users expect to interact with advanced GUI elements in a stand-alone environment.

Presently, advanced GUI elements are provided in a Web served environment using client-side computer logic typically implemented using a scripting language such as Visual Basic™ Script and JavaScript™ or newer browser technologies such as Dynamic HTML. The use of particular scripting languages and browser technologies, IQ-s however, can hinder platform portability in consequence of browser and interpreter incompatibilities. Hence, what is needed is a method for emulating advanced GUI elements in a content browser without further requiring the assistance of client-side program logic.

SUMMARY OF THE INVENTION

The present invention relates to the emulation of an advanced GUI element in a hypermedia content browser such as a Web browser. In particular, the invention can include a GUI element rendering method in which hypermedia content, such as a Web page, can be streamed from a content server to a content browser over a computer communications network. The hypermedia content can include markup defining a form. As in the case of conventionally specified forms, the form itself can include one or more submittable input elements, each submittable input element having a corresponding key-value pair. Each key-value pair, in turn, can include an identifying key and a value, wherein at least one of the identifying keys can include a "shallow form" submit key which indicates a request for advanced GUI element processing.

As end-users activate certain submittable input elements in the form through the content browser, the associated key-value pairs can be transmitted across the computer communications network to the content server. Upon receipt of the key-value pairs, the content server can identify from among the key-value pairs a shallow form submit key. Responsive to identifying the shallow form submit key, advanced GUI element processing can be performed based upon values which are associated with the identified shallow form submit key. In particular, advanced GUI elements can be generated and returned to the content browser in which the hypermedia content can be rendered to include the newly formed advanced GUI element.

The use of the present invention can overcome the deficiencies of the prior art by eliminating the reliance on client-side program logic to perform advanced GUI element rendering in a content browser. Rather, in accordance with the inventive arrangements, only a shallow submit key need be associated with a form-based submittable input element to invoke advanced image processing in the content server. Hence, the present invention enables a Web-based application to emulate the look and feel of a standard application user interface. Furthermore, because the image processing is initiated in the content server and not in another network entity such as an application server, the back-end application logic needn't be modified to accommodate the shallow submit key regardless of whether the user interface is presented using a high level language such as Java or HTML.

In one aspect of the invention, an advanced GUI element rendering method can include encoding advanced image rendering parameters in a markup tag in a hypermedia document, the markup tag specifying a form-based input element for display in a form in a content browser. The form-based input element can be associated with a unique identifier indicating a request for advanced image rendering. Upon activation of the form, the encoded parameters and the unique identifier can be encapsulated in a network request and the network request can be forwarded to a content server. The content server can detect the unique identifier and can forward the advanced image rendering parameters to an image processor. The image processor, in turn, can form an image based upon the parameters. Subsequently, the formed image can be received from the content server and rendered in the content browser.

The encoding step can include encoding the advanced image rendering parameters in a network address in the markup tag specifying the form-based input element. Upon activation, the parameters and the unique identifier can be encapsulated in a network request. The network request, in turn, can be forwarded to a content server accessible at the network address. The content server can detect the unique identifier and forward the advanced image rendering parameters to an image processor. Finally, the image processor can form an image based upon the parameters.

In a further aspect of the present invention, an advanced GUI element rendering method can include parsing name/value pairs encapsulated in a network request. Each name/value pair can have an association with a form-based input element in a hypermedia document displayed in the content browser. An identifier can be detected from among the parsed name/value pairs which denotes a request for advanced image processing. In response, the request for advanced image processing can be routed to an image processor, wherein the image processor can construct an image based upon image display parameters contained in the name/value pair associated with the detected identifier. The constructed image can be encapsulated in a network response and the network response can be forwarded to the content browser. Upon receipt of the network response, the content browser can extract the constructed image from the network response and can render the constructed image in the content browser as part of a modified version of the hypermedia document.

In addition to merely processing a request for advanced image processing, the method of the invention also can include the step of suppressing further processing of the network request by other network entities. In this way, back-end logic can remain oblivious to the advanced image processing performed in the content server. Finally, the method can include the step of validating data in selected ones of the parsed name/value pairs while the image processor constructs the image.

In yet a further aspect of the invention, a GUI element rendering method can include loading from memory a first hypermedia document encoded with markup tags which specify a form, the form including one or more form elements. A key can be associated with each of the form elements in the first hypermedia document. At least one of the keys can denote an advanced GUI element. In particular, the associating step can include selecting a key which denotes a particular type of advanced GUI element; and, associating the selected key with a form element comprising the particular type of advanced GUI element.

Subsequently, the first hypermedia document can be provided to a content browser. A user can interact with the content browser and ultimately can cause the submission of the form. In consequence, one or more key-value pairs can be received from the content browser which correspond to the form elements in the first hypermedia document. At least one of the received key-value pairs can include a key which denotes an advanced GUI element. Furthermore, the key-value pair also can include one or more display parameters specifying display characteristics for an advanced GUI element.

An advanced GUI element having display characteristics based upon the display parameters can be generated subsequent to which a second hypermedia document can be encoded with the generated advanced GUI element. Importantly, data in the key-value pairs can be validated while the advanced GUI element is generated. Finally, the second hypermedia document can be provided to the content browser.

In yet a further aspect of the invention, a GUI element rendering method can include serving a Web page to a Web browser. The Web page can include markup which defines a form and the form can include one or more submittable input elements, each submittable input element having a corresponding key-value pair. The key-value pair can include an identifying key and a value, and one or more of the identifying keys can include a shallow form submit key indicating a request for advanced GUI element processing. One or more of the submitted key-value pairs can be received from the Web browser from among which a shallow form submit key can be identified. In consequence, advanced GUI element processing can be performed based upon values which are associated with the identified shallow form submit key.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

The present invention is a method for emulating an advanced GUI element in a hypermedia content browser such as a Web browser. The advanced GUI element emulation method can be performed in a system which includes a content server and a content browser, communicatively linked across a computer communications network such as the Internet. The content browser can request, receive and render hypermedia content which includes markup defining a form. The form can include one or more submittable input elements such as text fields, buttons, images and the like.

As in conventional Web-based forms, each submittable input element can further have a corresponding key-value pair, each key-value pair having an identifying key and a value. Importantly, at least one of the identifying keys can include a "shallow form" submit key. More particularly, a "shallow form" submit key indicates a request for advanced GUI element processing and further indicates that the request should not be forwarded to application logic as the request solely pertains to the rendering of an advanced GUI element.

As end-users activate certain ones of the submittable input elements in the form through the content browser, the associated key-value pairs can be "submitted" across the computer communications network to the content server as is well-known in the art. Upon receipt of the key-value pairs, the content server can detect the shallow form submit key from among the key-value pairs. Responsive to identifying the shallow form submit key, advanced GUI element processing can be performed based upon values which are associated with the identified shallow form submit key. In particular, an advanced GUI element can be generated and returned to the content browser in which the hypermedia content can be rendered to include the newly formed advanced GUI element.

Figure 1A:
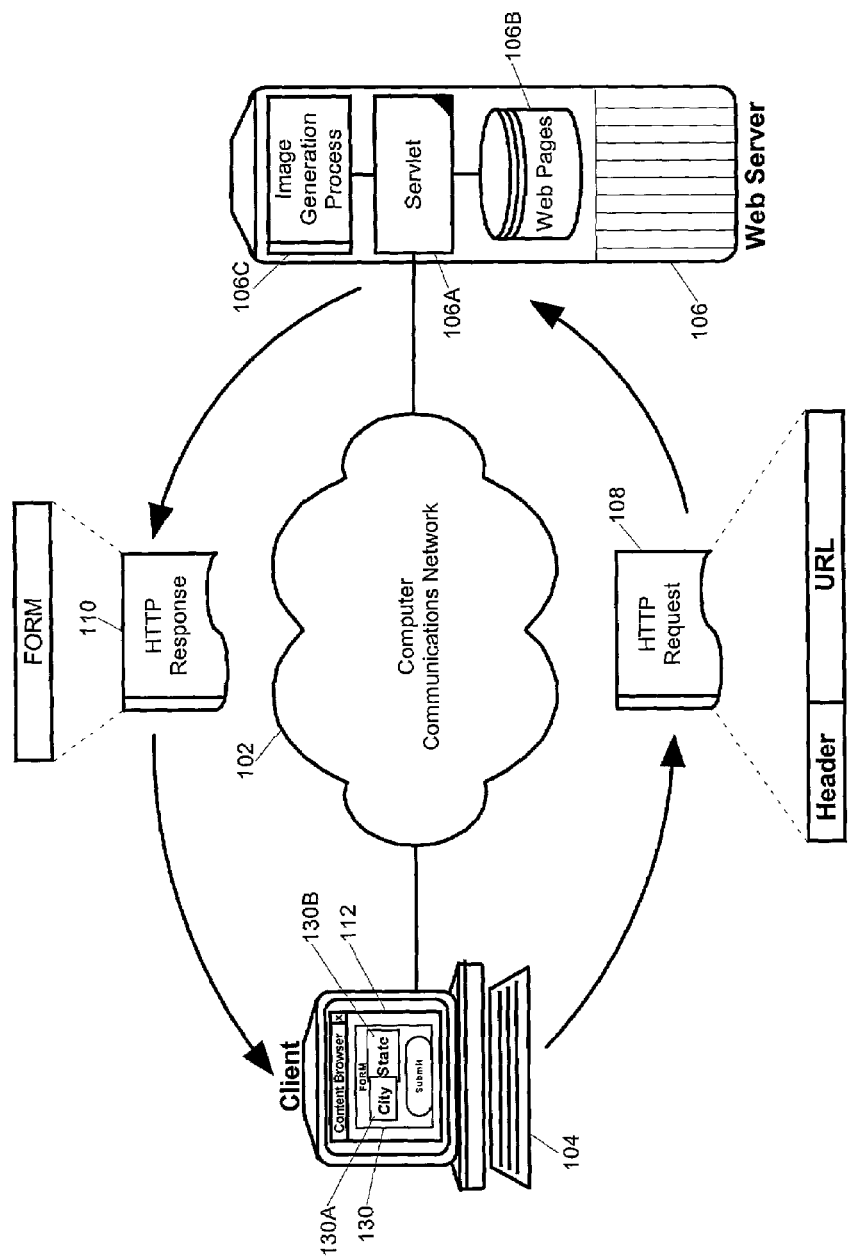
FIG. 1A is a schematic illustration of a content browser in a client computer requesting, receiving and rendering a form which has been configured to submit a request for advanced GUI element processing to a content server in accordance with the inventive arrangements.

FIG. 1A is a schematic illustration of a content serving and browsing system which has been particularly configured to emulate an advanced GUI element in a content browser. Specifically, the system can include a Web server 106 and a client computer 104, communicatively linked via a computer communications network 102, for example the Internet. A content browser 112 such as a Web browser can operate within the client computer 104. As is well known in the art, the content browser 112 can load and display hypermedia content, for instance Web pages, XML documents, graphics images and audio-visual content. Additionally, where configured with suitable add-in logic, the content browser can present audio material such as pre-recorded and live speech and music and animated graphical material. The content server 106, by comparison, can store therein hypermedia content such as Web pages 106B which can be "served" to requesting clients such as client 104 as is well-known in the art.

In the context of the content browser 112 of FIG. 1, a Hypertext Markup Language (HTML) compliant document which has been provided, for instance, by the content server 106, can be displayed in the content browser 112. In particular, a network address can be included as part of a uniform resource locator (URL) which specifies the network location of the content server 106. The URL can further specify particular hypermedia content to be delivered to the content browser 112. Subsequently, the HTTP request 108 can be provided to the content server 106 over the Internet 102, the HTTP request 108 requesting delivery of the hypermedia content further specified in the URL.

Upon receipt, the content server 106 can process the HTTP request 108 to identify the requested hypermedia content encoded therein. In the particular example illustrated in FIG. 1A, the content server 106 can identify a request for hypermedia content which includes the specification of a form 130. In accordance with version 3.2 of the HTML specification, a form 130 can be specified in a hypermedia document through the use of the FORM markup tag. In the FORM markup tag, INPUT fields can be provided which denote submittable input elements. Notably, in version 3.2 of the HTML specification, the FORM-related INPUT tag defines a form element that can receive user input. The INPUT tag can be used in conjunction with a TYPE attribute. The TYPE attribute can determine the specific sort of form element to be created. In version 3.2 of the HTML specification, TYPE can be one of the following: BUTTON, CHECKBOX, FILE, HIDDEN, IMAGE, PASSWORD, RADIO, RESET, SUBMIT, and TEXT.

As is known in the art, an HTML FORM is analogous to a conventional paper form in which certain data fields are pre-specified and presented to an end-user. The end-user can "fill out" the form by providing data which corresponds to particular ones of the pre-specified fields. In version 3.2 of the HTML specification, end-users can electronically "fill out" a form and submit the form to a back-end server such as the content server 106 of FIG. 1. In one aspect of the present invention, the data provided by the end-user can be provided to the content server 106 via one of the HTML specified GET or POST operations.

More specifically, once the end-user has decided to "submit" a form, the contents of the form can be concatenated into name/value pairs each name/value pair including a pre-specified field and corresponding user-provided value. The name/value pairs can be encapsulated in an HTTP request and forwarded via the GET or POST operation to a content server for further processing. Ordinarily, an HTML FORM provides for further processing through a Common Gateway Interface (CGI) in a Web server. In the present invention, however, the system is not so limited. Rather, in the present invention, HTTP requests can be further processed by other forms of server-side processing logic such as the servlet 106A.

Returning now to FIG. 1A, for illustrative purposes only, the form 130 included in the requested hypermedia content includes three submittable input elements-two image fields 130A, 130B, and a submit button field 130C. In accordance with the inventive arrangements, the two image fields 130A, 130B can be specified by the HTML FORM-related markup tag, "<INPUT type=IMAGE> which can be used to emulate the well-known <INPUT type=BUTTON> tag. In version 3.2 of the HTML specification, the attribute value IMAGE specifies an activatable image for use in an associated FORM that, upon activation, can pass internal information to a processing script in a server. The following represents an acceptable syntax for the INPUT TYPE=IMAGE instruction:

```
<INPUT TYPE="IMAGE"
    ALIGN="LEFT"|"RIGHT"|"TOP"|"ABSMIDDLE"
        |"ABSBOTTOM"|"TEXTTOP"|"MIDDLE"
        |"BASELINE"|"BOTTOM"
    NAME="name"
    SRC="location">
```

In the above syntax, ALIGN specifies the alignment of the image in relation to the surrounding text. The possible values are LEFT, RIGHT, TOP, ABSMIDDLE, ABSBOTTOM, TEXTTOP, MIDDLE, BASELINE, and BOTTOM. In the above syntax, NAME=name specifies the name of the input element. This value is used as the name portion of the name/value pair for this element that is sent to the processing script when the associated form is submitted. Notably, the name is not displayed on the form.

Finally, SRC="location" specifies the network address of the image to be displayed in the document. An example of the use of the INPUT TYPE=IMAGE operation follows:

```
<FORM>
    <INPUT TYPE="image"
    SRC="http://my.graphics.com/graphic.gif"
    NAME="imgsub" ALIGN="top"
    WIDTH="50" HEIGHT="50">
</FORM>
```

In the present invention, the <INPUT type=IMAGE> tag permits the use of any arbitrary image as a submittable HTML element. More particularly, as will be apparent to one skilled in the art, images specified by the markup tag, <INPUT type=IMAGE>, can contain text, colors and styles typically not provided by other submittable HTML elements. In fact, the submittable HTML element, BUTTON, as defined by version 3.2 of the HTML specification, cannot accommodate such a wide variety of display parameters without also requiring additional client-side processing often provided by executable scripts and the like.

Importantly, in the present invention selected ones of the submittable input elements in the form 130, such as image field 130B can emulate advanced GUI elements. To configure the form 130 to request processing of an advanced GUI element, each submittable input element can have associated therewith a unique identifier. The unique identifier can specify whether the submittable input element should include a request for a "shallow form submit". Notably, though not shown explicitly in the exemplary illustration, the image field 130B can have associated therewith a unique identifier requesting a shallow form submit.

In the absence of a shallow form submit, the submission of the form is treated as a typical form submit. In contrast, in the presence of a shallow form submit, the submission of the form is treated as a request for advanced GUI image processing. In one aspect of the present invention, the unique identifiers are associated with the name/value pairs of each submittable element prior to the content server 106 encapsulating the hypermedia content into the HTTP response 110 and forwarding the HTTP response to the content browser 112 in the client computer 104. The content browser 112 can receive the HTTP response 110 and extract from therein the hypermedia content which can be rendered in the content browser 112. Once rendered, one or more end-users can interact with the rendered content including the form 130. The invention is not limited, however, in regard to the particular submittable input elements included in the form 130 and the composition and arrangement thereof. Rather, any combination of submittable input elements arranged in any particular fashion can suffice.

Figure 1B:
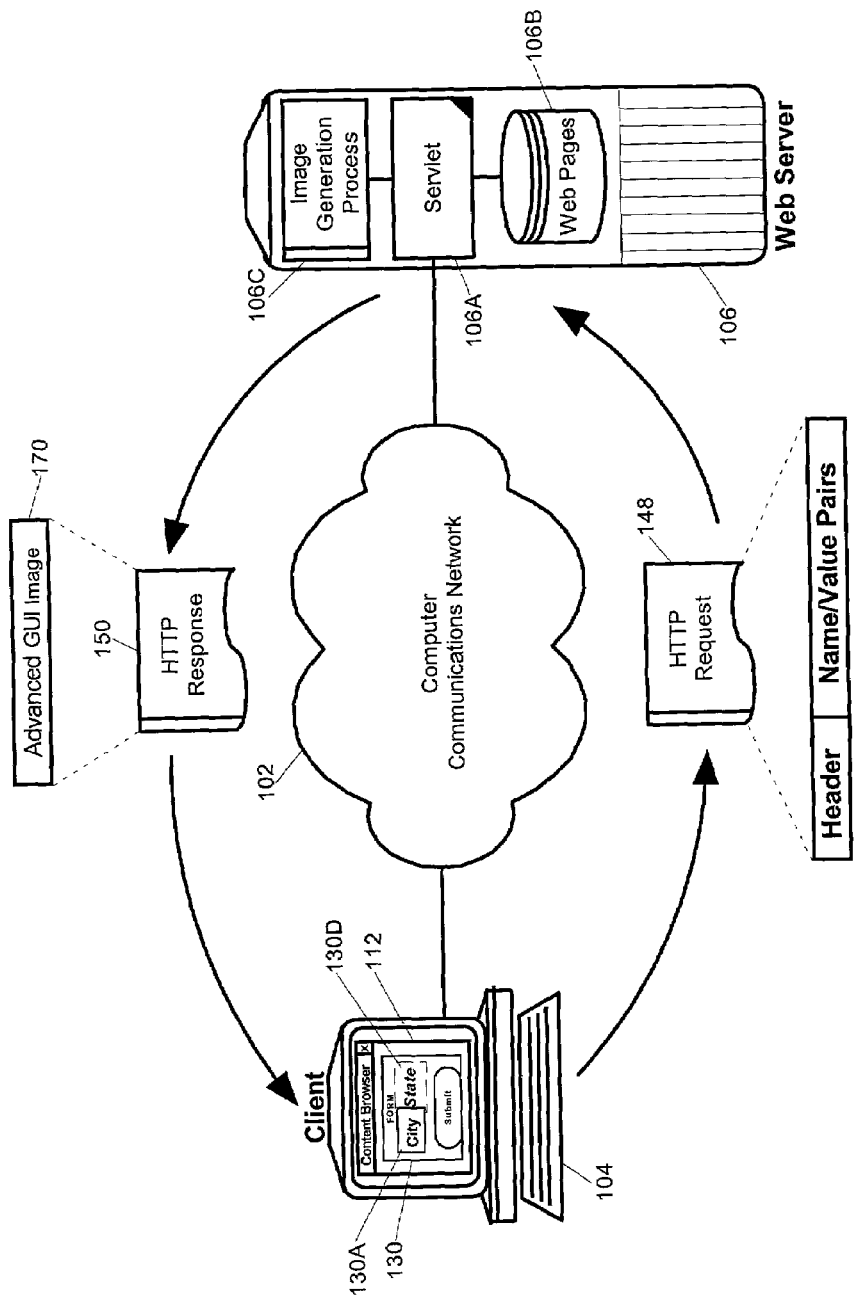
FIG. 1B is a schematic illustration of the content server of FIG. 1A receiving a request for advanced GUI element processing, generating an advanced GUI element in accordance therewith, and forwarding the advanced GUI element to the content browser to be rendered in accordance with the inventive arrangements; and, FIG. 2 is a flow chart depicting a process for emulating an advanced GUI element in a Web-based application in accordance with the inventive arrangements.

As shown in FIG. 1B, a user can activate a submittable form element causing the name/value pairs associated with the form 130 to be encapsulated in an HTTP request 148 and forwarded to the servlet 106A in the content server 106. Once the HTTP request 148 has been forwarded to the content server 106, the servlet 106 A can receive the HTTP request 148 and can parse the name/value pairs of the HTTP request 148. When parsing the name/value pairs, the servlet 106 A can detect the unique identifiers associated with the submittable input elements. If only unique identifiers associated with a deep form submit are detected, the HTTP request 148 can be handled conventionally. Specifically, the servlet 106 A can decode the URL which has been encapsulated in the HTTP request 148 and can return requested hypermedia content. Alternatively, where the HTTP request 148 includes a request for back-end logic processing, the request for back-end logic processing can be provided to a specified back-end application.

In the present invention, however, where a shallow form submit is detected by the servlet 106A, the servlet 106A can treat the request as a request for advanced image processing. To that end, further processing of the request can be suppressed and the data included in the name/value pairs can be temporarily stored. Optionally, the data can be validated pending the formation of an HTTP response 150. Finally, based upon the value of the unique identifier, a request can be forwarded to an image generation process 106C for advanced GUI image processing. Specifically, the image generation process 106C can generate an advanced GUI image to replace the activatable image already displayed in the content browser 112.

Importantly, though FIGS. 1A and 1B depict the image generation process 106C as being part of the content server 106, the invention is not limited in this regard. Rather, the image generation process 106 C can be performed externally or internally to the content server 106. Once generated, the advanced GUI image can be encoded, for example using the graphics interchange format (GIF), and returned to the servlet 106 A. The servlet 106A, in turn, can encapsulate the dynamically produced button in an HTTP response 150 which can be forwarded by the content server 106 to the client 104. Finally, the advanced GUI element, for example the feature rich button 130D can be rendered by the content browser 112.

Figure 2:
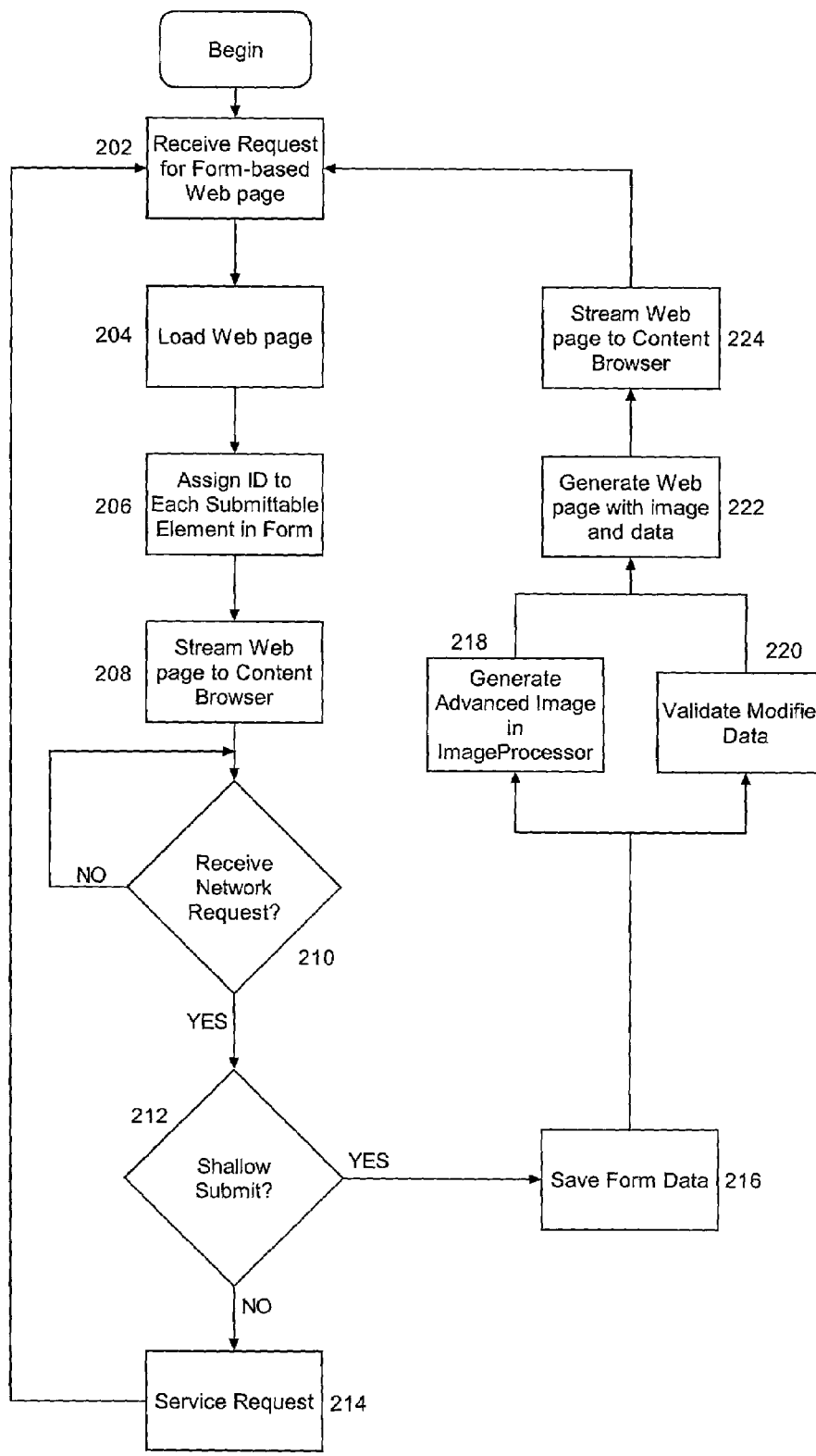

FIG. 2 is a flow chart depicting a process for emulating an advanced GUI element in a Web-based application in accordance with the inventive arrangements. The process can begin in block 202 in which an HTTP request can be received from a client browser. The HTTP can include a request for content which specifies a form. In block 204, the requested content can be located in storage and loaded into memory. In block 206, unique identifiers can be assigned to each submittable element in the form. Subsequently, in block 208 the content along with the unique identifiers can be streamed out to the client browser. In decision block 210, the process can repeat indefinitely for each further received network request.

If in decision block 210, a further network request is received, it can be determined whether the network request has resulted from a form submit in which case name/value pairs can be received. From an enumeration of the name/value pairs, in decision block 212 it can further be determined if any unique identifiers associated with any of the submittable form elements in the form include a request for a shallow form submit. If only a deep form submit is detected in decision block 212, in block 214 the network request can be processed conventionally. In contrast, if in block 212 a shallow form submit is detected, further processing of the network request can be suppressed pending advanced GUI image processing.

Specifically, in block 216 the form data included in the name/value pairs can be stored temporarily. In block 218, the unique identifier which triggered the shallow form submit can be forwarded to an image processor from which it can be determined what type of advanced GUI image to generate. Alternatively, the type of advanced GUI image to be generated can be determined prior to forwarding the request to the image processor. In that case, a request for a specific type of advanced GUI image can be forwarded to the image processor. In both cases, however, concurrently, in block 220 the selected data in the name/value pairs can be validated to ensure consistency with the requirements of the particular Web application.

In block 222, the image processor can generate an advanced GUI image based upon the display parameters. When the image processor has completed forming the advanced GUI image, the image can be compressed using a suitable graphics compression algorithm prior to being incorporated in a new hypermedia document. Subsequently, in block 226 the new hypermedia document can be forwarded to the content browser in which the new hypermedia document can be rendered.

Importantly, the method illustrated in FIG. 2 can have particular application to the rendering of advanced GUI elements such as tree nodes and notebook tabs normally included only in the most programmatically complex applications. In the case of a tree node, each collapsed node in the tree initially can be displayed in the form. In accordance with the inventive arrangements, each collapsed node can be an activatable input element in the form having a unique identifier associated therewith which has been configured to trigger a shallow form submit.

Upon activation of one of the collapsed nodes, the shallow form submit can be detected and an image of an expanded portion of the tree corresponding to the activated collapsed node can be generated in the image processor. Subsequently, the advanced GUI image of the expanded portion of the tree can replace the activated image of the collapsed node. Significantly, this type of advanced GUI image rendering can occur without the assistance of a client-side script. Rather, as the present invention requires only the use of conventional form-based markup tags, any suitable markup language such as HTML 3.2 will suffice.

Presently, advanced GUI elements are provided in a Web served environment using client-side computer logic typically implemented using a scripting language such as Visual Basic™ Script and JavaScript™ or newer browser technologies such as Dynamic HTML. The use of particular scripting languages and browser technologies, however, can hinder platform portability in consequence of browser and interpreter incompatibilities. The present invention addresses the apparent deficiencies of these current solutions by providing logic in the content server which can distinguish between requests for routine processing and requests for advanced GUI image processing. Upon detection of a request for advanced GUI image processing, the present invention can generate an advanced GUI image and provide the generated image to the client browser for rendering. Significantly, the advanced GUI image can be generated without requiring the use of problematic scripting languages or browser technology in the client. Hence, advanced GUI images can be provided using only conventional markup language technology such as HTML version 3.2.

The present invention can be realized in hardware, software, or a combination of hardware and software. A method and apparatus for emulating an advanced GUI image in a hypermedia content browser according to the present invention can be realized in a centralized fashion in one computer system, or in a distributed fashion where different elements are spread across several interconnected computer systems. Any kind of computer system, or other apparatus adapted for carrying out the methods described herein, is suited.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. An advanced graphical user interface (GUI) element rendering method comprising the steps of:

parsing name/value pairs encapsulated in a network request, each said name/value pair having an association with a form-based input element in a hypermedia document displayed in a content browser;

detecting among said parsed name/value pairs, an identifier which denotes a request for advanced image processing;

routing said request for advanced image processing to an image processor, said image processor constructing an image based upon image display parameters contained in a name/value pair associated with said detected identifier;

encapsulating said constructed image in a network response; and, forwarding said network response to said content browser, said content browser extracting said constructed image from said network response and rendering said constructed image in said content browser as part of a modified version of said hypermedia document.

2. The method of claim 1, further comprising the step of suppressing further processing of said network request by other network entities.

3. The method of claim 1, further comprising the step of validating data in selected ones of said parsed name/value pairs while said image processor constructs said image.

4. An advanced graphical user interface (GUI) element rendering method comprising the steps of:

encoding advanced image rendering parameters in a markup tag in a hypermedia document, said markup tag specifying a form-based input element for display in a form in a content browser;

associating with said form-based input element, a unique identifier indicating a request for advanced image rendering;

upon activation of said form, encapsulating said encoded parameters and said unique identifier in a network request and forwarding said network request to a content server, said content server detecting said unique identifier and forwarding said advanced image rendering parameters to an image processor, said image processor forming an image based upon said parameters;

receiving said formed image from said content server; and, rendering said formed image in said content browser.

5. The method of claim 4, wherein said encoding step comprises encoding said advanced image rendering parameters in a network address in said markup tag specifying said form-based input element.

6. The method of claim 5, wherein said encapsulating step comprises the step of, upon activation, encapsulating said parameters and said unique identifier in a network request and forwarding said network request to a content server accessible at said network address, said content server detecting said unique identifier and forwarding said advanced image rendering parameters to an image processor, said image processor forming an image based upon said parameters.

7. An advanced graphical user interface (GUI) element rendering method comprising the steps of:

loading from memory a first hypermedia document encoded with markup tags which specify a form, said form comprising a plurality of form elements;

associating a key with each of said plurality of form elements in said first hypermedia document, at least one of said keys denoting an advanced GUI element;

providing said first hypermedia document to a content browser;

receiving from said content browser a plurality of key-value pairs corresponding to said form elements in said first hypermedia document, at least one of said key-value pairs being associated with said key which denotes an advanced GUI element, said at least one key-value pair further comprising a plurality of display parameters specifying display characteristics for an advanced GUI element;

generating an advanced GUI element having display characteristics based upon said display parameters and encoding a second hypermedia document with said generated advanced GUI element; and, providing said second hypermedia document to said content browser.

8. The method of claim 7, further comprising the step of validating data in said key-value pairs while said advanced GUI element is generated.

9. The method of claim 7, wherein said associating step comprises the steps of:

selecting a key which denotes a particular type of advanced GUI element; and, associating said selected key with a form element comprising said particular type of advanced GUI element.

10. An advanced graphical user interface (GUI) element rendering method comprising the steps of:

serving a Web page to a Web browser, said Web page comprising markup which defines a form, said form comprising a plurality of submittable input elements, each said submittable input element having a corresponding key-value pair, said key-value pair comprising an identifying key and a value, at least one of said identifying keys comprising a shallow form submit key indicating a request for advanced GUI element processing;

receiving a plurality of submitted key-value pairs from said Web browser;

identifying a shallow form submit key from among said submitted key-value pairs; and, performing advanced GUI element processing based upon values which are associated with said identified shallow form submit key.

11. A machine readable storage for executing a computer program for rendering an advanced graphical user interface (GUI) element, said computer program comprising a routine set of instructions for causing the machine to perform the steps of:

parsing name/value pairs encapsulated in a network request, each said name/value pair having an association with a form-based input element in a hypermedia document displayed in a content browser;

detecting among said parsed name/value pairs, an identifier which denotes a request for advanced image processing;

routing said request for advanced image processing to an image processor, said image processor constructing an image based upon image display parameters contained in a name/value pair associated with said detected identifier;

encapsulating said constructed image in a network response; and, forwarding said network response to said content browser, said content browser extracting said constructed image from said network response and rendering said constructed image in said content browser as part of a modified version of said hypermedia document.

12. The machine readable storage of claim 11, further comprising the step of suppressing further processing of said network request by other network entities.

13. The machine readable storage of claim 11, further comprising the step of validating data in selected ones of said parsed name/value pairs while said image processor constructs said image.

14. A machine readable storage for executing a computer program for rendering an advanced graphical user interface (GUI) element, said computer program comprising a routine set of instructions for causing the machine to perform the steps of:

encoding advanced image rendering parameters in a markup tag in a hypermedia document, said markup tag specifying a form-based input element for display in a form in a content browser;

associating with said form-based input element, a unique identifier indicating a request for advanced image rendering;

upon activation of said form, encapsulating said encoded parameters and said unique identifier in a network request and forwarding said network request to a content server, said content server detecting said unique identifier and forwarding said advanced image rendering parameters to an image processor, said image processor forming an image based upon said parameters;

receiving said formed image from said content server; and, rendering said formed image in said content browser.

15. The machine readable storage of claim 14, wherein said encoding step comprises encoding said advanced image rendering parameters in a network address in said markup tag specifying said form-based input element.

16. The machine readable storage of claim 15, wherein said encapsulating step comprises the step of, upon activation, encapsulating said parameters and said unique identifier in a network request and forwarding said network request to a content server accessible at said network address, said content server detecting said unique identifier and forwarding said advanced image rendering parameters to an image processor, said image processor forming an image based upon said parameters.

17. A machine readable storage for executing a computer program for rendering an advanced graphical user interface (GUI) element, said computer program comprising a routine set of instructions for causing the machine to perform the steps of:

loading from memory a first hypermedia document encoded with markup tags which specify a form, said form comprising a plurality of form elements;

associating a key with each of said plurality of form elements in said first hypermedia document, at least one of said keys denoting an advanced GUI element;

providing said first hypermedia document to a content browser;

receiving from said content browser a plurality of key-value pairs corresponding to said form elements in said first hypermedia document, at least one of said key-value pairs being associated with said key which denotes an advanced GUI element, said at least one key-value pair further comprising a plurality of display parameters specifying display characteristics for an advanced GUI element;

generating an advanced GUI element having display characteristics based upon said display parameters and encoding a second hypermedia document with said generated advanced GUI element; and, providing said second hypermedia document to said content browser.

18. The machine readable storage of claim 17, further comprising the step of validating data in said key-value pairs while said advanced GUI element is generated.

19. The machine readable storage of claim 17, wherein said associating step comprises the steps of:

selecting a key which denotes a particular type of advanced GUI element; and, associating said selected key with a form element comprising said particular type of advanced GUI element.

20. A machine readable storage for executing a computer program for rendering an advanced graphical user interface (GUI) element, said computer program comprising a routine set of instructions for causing the machine to perform the steps of:

serving a Web page to a Web browser, said Web page comprising markup which defines a form, said form comprising a plurality of submittable input elements, each said submittable input element having a corresponding key-value pair, said key-value pair comprising an identifying key and a value, at least one of said identifying keys comprising a shallow form submit key indicating a request for advanced GUI element processing;

receiving a plurality of submitted key-value pairs from said Web browser;

identifying a shallow form submit key from among said submitted key-value pairs; and, performing advanced GUI element processing based upon values which are associated with said identified shallow form submit key.

* * * * *